United States Patent [19]

Bales

[11] 4,330,662
[45] May 18, 1982

[54] ORDERED COPOLYESTERCARBONATE RESINS

[75] Inventor: Stephen E. Bales, Midland, Mich.

[73] Assignee: The Dow Chemical Company, Midland, Mich.

[21] Appl. No.: 200,759

[22] Filed: Oct. 27, 1980

[51] Int. Cl.$^3$ ............................................. C08G 63/12
[52] U.S. Cl. .................................... 528/176; 528/26; 528/272
[58] Field of Search ......................... 528/26, 176, 272

[56] References Cited

U.S. PATENT DOCUMENTS

| | | | |
|---|---|---|---|
| 4,156,069 | 5/1979 | Prevorsek et al. ................... | 528/182 |
| 4,173,701 | 11/1979 | Murata et al. ...................... | 528/176 |
| 4,260,731 | 4/1981 | Mori et al. ......................... | 528/173 |
| 4,278,787 | 7/1981 | Swart et al. ........................ | 528/176 |

*Primary Examiner*—J. Ziegler
*Attorney, Agent, or Firm*—Michael S. Jenkins

[57] ABSTRACT

Ordered copolyestercarbonate resins having repeating units of the formula:

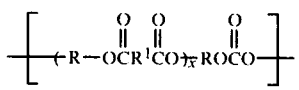

wherein a portion of $R^1$ is meta-phenylene and a portion of $R_1$ is para-phenylene and R is independently an aromatic hydrocarbylene or inertly substituted aromatic hydrocarbylene, e.g.,

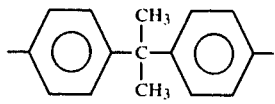

exhibit physical properties such as heat resistance, clarity and impact strength that are superior to the comparable properties of corresponding random copolymers. They exhibit melt processability that is superior to the melt processability of corresponding copolyestercarbonates wherein $R^1$ is entirely para-phenylene. They exhibit heat resistance, notch sensitivity and low temperature impact resistance that are superior to comparable properties of corresponding copolyestercarbonates wherein $R^1$ is entirely meta-phenylene. Such resins are useful for making transparent tough films and molded articles having high heat resistance.

3 Claims, No Drawings

ORDERED COPOLYESTERCARBONATE RESINS

BACKGROUND OF THE INVENTION

This invention relates to linear copolyesters that contain both carbonate groups and carboxylate groups in a linear chain.

Polycarbonate resins are known to be tough and rigid and have moderately high softening temperatures. Of particular interest are the polycarbonates of bisphenol-A diols as described in U.S. Pat. No. 3,028,365. On the other hand, polyesters such as those derived from terephthalic acid, isophthalic acid and/or 1,4-butanediol are well known as molding resins having high softening temperatures but poor impact resistances.

In the past, it has been a practice to make random linear copolymers containing ester and carbonate linkages in order to obtain polymers having heat distortion temperatures generally higher than those characteristic of polycarbonates. See, for example, U.S. Pat. Nos. 3,169,121; 3,549,570; 3,053,810; 3,030,331 and 3,220,976. Unfortunately, however, the desired increase in heat distortion is often not as high as needed for many applications. More importantly, any increase in heat distortion is achieved only by sacrificing almost all of the high impact resistance that is characteristic of polycarbonate resins.

More recently, as described in U.S. Pat. Nos. 4,156,069 and 4,105,633, it has been found that, by alternating or ordering the ester and carbonate linkages in the copolyestercarbonate polymer molecule, improved thermal resistance is achieved without a corresponding sacrifice of physical strength. However, such ordered copolyestercarbonates do not exhibit the degree of processability desired for many molding applications.

In view of the aforementioned deficiencies of conventional polyesters, polycarbonates and random, as well as ordered, copolymers thereof, it would be highly desirable to provide a polymer of the same or similar monomeric materials wherein improved processability is obtained without sacrificing the impact resistance and heat resistance characteristics of conventional ordered copolyestercarbonates.

SUMMARY OF THE INVENTION

Accordingly, the present invention is such a polymer. This polymer is a normally solid ordered copolyestercarbonate containing repeating units having the formula:

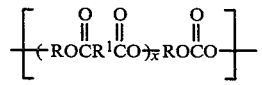

wherein each R is independently aromatic hydrocarbylene or inertly substituted aromatic hydrocarbylene; some of $R^1$ are meta-phenylene and some are para-phenylene provided that the ratio of meta-phenylene to para-phenylene is such that the melt processability of the copolymer as defined hereinafter is improved; and x is a number from 0.05 to 10. Hereinafter, the ordered copolyestercarbonate of this invention will be called a mixed copolymer or a mixed copolyestercarbonate. For the purposes of this invention, an "inertly substituted" group is one having one or more substituents which are inert in the condensation reaction used to prepare the copolymer. "Hydrocarbylene" is a predominantly hydrocarbon divalent radical including aliphatic and/or aromatic hydrocarbon diradicals as well as hydrocarbon radicals linked together by

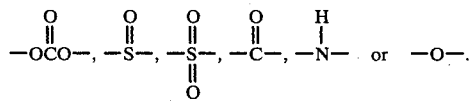

The melt processability of the mixed copolyestercarbonate as measured by the test described in Table I hereinafter is considered improved if the pressure required to injection mold a sample of the aforementioned copolyestercarbonate is less than that required to mold an ordered copolyestercarbonate that is similar in all respects except that $R^1$ is entirely para-phenylene (hereinafter called a para-phenylene copolymer or para-phenylene copolyestercarbonate).

This mixed copolymer is advantageously prepared by first reacting an excess of a dihydric hydrocarbylene with a mixture of isophthaloyl halide and terephthaloyl halide and then reacting the resulting dihydroxyester product with phosgene or a similar compound capable of forming carbonate linkages with diols. The first reaction is advantageously carried out in the presence of a hydrogen chloride acceptor such as pyridine. The second reaction is typically effected using conditions common to the reaction of phosgene with simple diols to form polycarbonates. This two-step reaction to prepare the copolymer can be represented by the following:

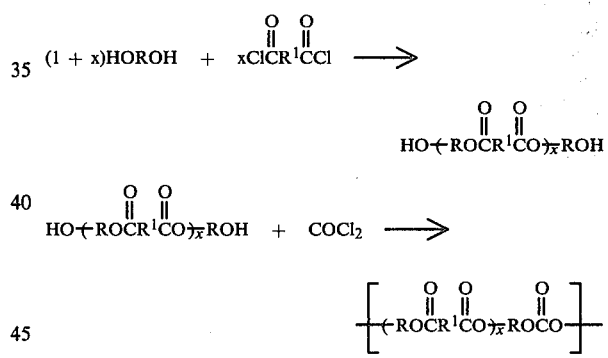

wherein R, $R^1$ and x are as defined hereinbefore.

While the mixed copolymers of this invention are similar in many respects to the corresponding para-phenylene copolymers, the mixed copolymers exhibit melt processability that is unexpectedly better than that of the para-phenylene copolymers. Even more surprising is that mixed copolymers of this invention exhibit higher heat resistance, reduced notch sensitivity and better low temperature impact resistance compared to similar ordered polymers wherein $R^1$ is entirely meta-phenylene (hereinafter called meta-phenylene copolymers or meta-phenylene copolyestercarbonates). Accordingly, the mixed copolymers of this invention, particularly the resinous ones, are useful in most applications in which polycarbonates, polyesters and copolymers thereof are conventionally employed. In particular, such mixed copolymers are useful for making transparent tough films and molded articles having high heat resistance. In addition, such mixed copolymers may be blended with other polymers such as ABS resins, styrene/acrylonitrile copolymers and impact polystyrenes to provide molding blends and/or they may be combined with reinforcing fibers such as glass fibers.

DETAILED DESCRIPTION OF ILLUSTRATIVE EMBODIMENTS

The dihydric hydrocarbylene employed in preparing the mixed copolymers of this invention is suitably any predominantly hydrocarbon compound containing at least two alcoholic hydroxyl groups wherein alcoholic hydroxyl includes phenolic hydroxyl. Included within the dihydric hydrocarbylenes are aliphatic diols including glycols and cycloaliphatic diols, aromatic diols, including alkaryl diols, dihydric phenols and aromatic diols having heterocyclic groups such as phenolphthalein. Of the dihydric hydrocarbylenes, the dihydric phenols are preferred.

The dihydric phenols preferably used in preparing the mixed copolymers of the present invention are suitably any aromatic compound having an aromatic hydrocarbylene group to which is aromatically bonded two hydroxyl groups. Most advantageously, the dihydric phenols are those aromatic diols represented by the formula:

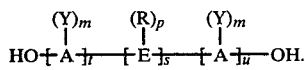

In the formula, A is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene; a sulfur-containing linkage such as sulfide, sulfoxide or sulfone, an ether linkage; a carbonyl group; a tertiary nitrogen group or a silicone-containing linkage such as silane or siloxy. R is hydrogen or a monovalent hydrocarbon group such as alkyl, aryl, arylalkyl or cycloaliphatic; Y is chlorine, bromine, fluorine or R wherein R is defined above. The letter m is any whole number from and including zero through the number of positions on A available for substitution; p is any whole number from and including zero through the number of available positions on E; t is whole number equal to at least one; s is either zero or one and u is any whole number including zero. Examples of such dihydric phenols include 2,2-bis-(4-hydroxyphenyl)propane [bisphenol-A]; bis-(4-hydroxyphenyl)methane; 1,1-bis-(4-hydroxyphenyl)-ethane and others including dihydroxy aromatic ethers listed in U.S. Pat. No. 3,169,121 at Column 2, line 60 through Column 3, line 55.

Also included among the suitable dihydric phenols are those having an ar,ar'-dihydroxytrityl nucleus represented by the formula:

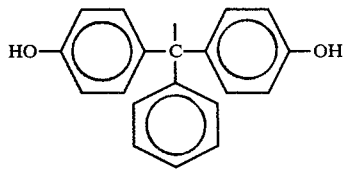

wherein the aromatic rings bear, in addition to the hydroxy substituents, such substituents as H, F, Cl, Br, I, —NO$_2$, —O—, alkyl, acyl, carboxylate ester, sulfonate ester and the like. Representative diols containing the ar,ar'-dihydroxytrityl nucleus include phenolphthalein nucleus compounds as described in U.S. Pat. No. 3,036,036; phenolsulfonephthalein nucleus compounds described in U.S. Pat. No. 3,036,037; phthalidene nucleus compounds as described in U.S. Pat. No. 3,036,038; fluorescein nucleus compounds as described in U.S. Pat. No. 3,036,039 and phenolphthalimidine nucleus compounds corresponding to the phenolphthalein nucleus compounds described in U.S. Pat. No. 3,036,036; all of which patents are hereby incorporated by reference. Of the aforementioned dihydric phenols, the bis(ar-hydroxyphenyl)alkylidenes, particularly bisphenol-A, and phenolphthalein are preferred, with bisphenol-A being most preferred.

In the preparation of the mixed copolymers of this invention, any isophthaloyl halide or terephthaloyl halide is suitably employed provided that the isophthaloyl halide and terephthaloyl halide are employed in proportions sufficient to provide improved melt processability. Most preferably, however, the isophthaloyl halide is isophthaloyl chloride, and the terephthaloyl halide is terephthaloyl chloride, with the corresponding bromides and iodides being suitable but less preferred than the chlorides. Suitable alternatives to the isophthaloyl and terephthaloyl halides include inertly substituted derivatives of such halides wherein an inert substituent is halo, hydrocarbyl such as alkyl or aryl, halohydrocarbyl and the like. The isophthaloyl and terephthaloyl halides are prepared by reacting the desired isophthalic acid or terephthalic with thionyl chloride or other thionyl halide in aromatic solvent, e.g., under conditions described in *High Polymers*, Vol. XXVII, "Condensation Monomers," J. K. Stille and T. W. Campbell, editors, pages 509–514, Wiley-Interscience, 1972.

The mixed copolymers are advantageously prepared by a two-step process wherein an excess of the dihydric hydrocarbylene is first reacted with a mixture of the isophthaloyl halide and terephthaloyl halide in the presence of a hydrogen chloride acceptor such as pyridine. The dihydroxyester intermediate produced by this reaction is then reacted with phosgene or other agent which will suitably form the desired carbonate linkages. Both steps of the process are normally carried out under an inert atmosphere such as nitrogen with the reactants dissolved in one or more solvent such that the reactants are totally miscible. While the concentrations of the reactants in the solvents are not particularly critical, the concentration of dihydric hydrocarbylene is preferably from about 2 to about 10 weight percent and the concentration of the mixture of isophthaloyl halide and terephthaloyl halide is preferably from about 1 to about 5 weight percent based on the total weight of monomers and solvents. In the second step of the reaction, the concentration of ester intermediate is preferably from about 3 to about 15 weight percent based on total weight of ester intermediate and solvents. It is preferred that the solutions of the various reactants be totally miscible in each other. It is sufficient, however, if such solutions are partially miscible, i.e., at least 10 weight percent. Examples of suitable solvents include chlorinated aliphatic hydrocarbons such as methylene chloride, chloroform, sym-tetrachloroethane, 1,1,2-trichloroethane and cis-1,2-dichloroethylene.

The molar ratio of dihydric hydrocarbylene to phthaloyl halide (as used herein, phthaloyl halide means total of isophthaloyl and terephthaloyl halide) varies proportionately with the ester:carbonate ratio desired in the mixed copolymer. Preferably, the molar ratio of dihydric hydrocarbylene to phthaloyl halide is advantageously from about 21:1 to about 1.1:1, most preferably from about 21:1 to about 1.3:1. Any molar ratio of terephthaloyl to isophthaloyl halide which yields a mixed copolymer having improved processability is suitable. Preferably, however, the molar ratio of terephthaloyl to isophthaloyl is from about 19:1 to about 0.05:1, most preferably from about 9:1 to about 1:1. The molar ratio of dihydroxyester intermediate to phosgene is advantageously from about 1:1 to about 1:1.2, preferably about 1:1.01 to about 1:1.08.

While pyridine is the preferred hydrogen chloride acceptor employed in the first step of this process, other suitable acceptors include other amine bases such as triethylamine, N,N-dimethylaniline and N,N-dimethylcyclohexylamine. Such acceptors are advantageously employed in amounts sufficient to complex the hydrogen chloride liberated and to catalyze both steps of the process.

Since higher concentrations of the acceptor produce higher molecular weight copolymers, actual concentrations of acceptor will vary depending upon the molecular weight desired. Moreover, at constant terminator levels, higher monomer concentrations produce higher molecular weight mixed copolymers. Therefore, the concentrations of monomers vary depending upon the molecular weight desired. Preferably, in order to prepare mixed copolymers having weight average molecular weights (Mw) from 25,000 to 60,00, the acceptor is employed in amounts from about 100 to about 160 mole percent based on moles of hydroxyl moiety in the monomers, most preferably from about 120 to about 140 mole percent. At such acceptor concentrations, the concentrations of monomers are preferably in the range from about 3 to about 15 weight percent, most preferably from about 5 to about 12 weight percent.

In carrying out the two-step process, the dihydric hydrocarbylene and phthaloyl halide are combined in any manner, preferably by adding the phthaloyl halide either neat or dissolved in a suitable solvent with stirring to a solution of the dihydric hydrocarbylene and hydrogen chloride acceptor. While stirring rate is not critical, a stirring rate of about 50 to about 500 rpm, most preferably from about 150 to 300 rpm, is maintained. While reaction temperature is not critical, the reaction temperature of the first step is preferably maintained in the range from about 10° to about 35° C., most preferably from about 19° to about 25° C. Reaction pressures are similarly not critical, however, atmospheric to superatmospheric pressures are normally employed as a matter of convenience. The ester intermediate is normally formed under these conditions in about 1 to about 10 minutes after addition of the phthaloyl halide. While the ester intermediate may be recovered and purified before proceeding to the second step of the process, it is generally not desirable to do so.

Accordingly, the aforementioned reaction mixture containing the ester intermediate is converted to the mixed copolymer by bubbling phosgene or other suitable carbonate forming reactant into the reaction mixture. Advantageously, the reaction mixture contains an amount of a monohydric phenol or other suitable chain terminator to effect desired control of the molecular weight of the resulting mixed copolymer. While the amount of chain terminator employed varies with the efficacy of the terminator and the molecular weight desired, beneficial amounts of terminator are normally in the range from about 1 to about 10 mole percent based on ester intermediate, preferably from about 2 to about 7 mole percent. Although not critical, the reaction temperature of the second step is preferably maintained in the range from 10° to about 35° C., most preferably from about 20° to about 27° C. As in the first step, reaction pressures are normally atmospheric to superatmospheric as a matter of convenience. The mixed copolymer is normally formed under these conditions in about 1 to about 10 minutes after phosgene addition.

In both steps of the foregoing process, the reaction mixture is agitated sufficiently to effect intimate contact of the reactants and desired heat transfer throughout the reaction medium. Following completion of the second step of the process, the mixed copolymer is readily recovered from the reaction medium by conventional techniques as exemplified in the following examples. Due to the ease of preparation and less expensive starting materials, the mixed copolymers derived from bisphenol-A and isophthaloyl chloride and terephthaloyl chloride are preferred.

The mixed copolymers of this invention are more advantageously represented by the formula:

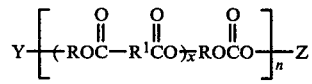

wherein Y and Z are independently terminating groups common to polyesters or polycarbonates; R, R$^1$, and x are as defined hereinbefore and n is a whole number from about 5 to about 300. Advantageously, the molar ratio of para-phenylene to meta-phenylene is from about 0.95:0.05 to about 0.05:0.95, preferably from about 0.95:0.05 to about 0.2:0.8, most preferably from about 0.9:0.1 to about 0.5:0.5. Illustratively, Y is

 or

wherein R$^2$ is hydrocarbyl such as alkyl, aryl or aralkyl; and R and R$^1$ are as defined hereinbefore. Representative Z includes

wherein R$^2$ and R are as defined hereinbefore.

The mixed copolymers having repeating units are most advantageously represented by the formula:

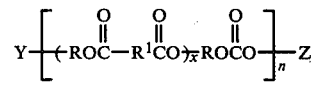

wherein Y is —OH or

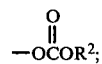

Z is —R$^2$ or —ROH; x is 0.05 to 10, preferably 0.05 to 3; and R, R$^1$, R$^2$ and n are as defined hereinbefore.

Preferred mixed copolymers are those represented by the foregoing formula wherein Y is

Z is —R²; R² is hydrocarbyl, e.g., alkyl, aryl, alkaryl, cycloalkyl or aralkyl; and n is a whole number from about 5 to about 300, preferably from about 10 to about 200 and most preferably from about 30 to about 100. For purposes of this invention, hydrocarbyl is a monovalent hydrocarbon radical. In the most preferred mixed copolymers Y is

Z is —R²; R² is

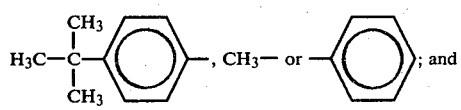

R is

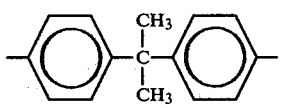

While the molecular weight of the mixed copolymers of this invention is not particularly critical, those having weight average molecular weight (Mw, determined by gel permeation chromatography using a bisphenol-A polycarbonate calibration curve) greater than 20,000 are of more significance. It is found that those mixed copolymers of relatively high molecular weight, e.g., those having a Mw of at least about 25,000 up to and including those having a Mw of about 60,000, are found to exhibit the properties and physical characteristics most desirable of molding resins. Most preferred for this purpose are those mixed copolymers having a Mw in the range from about 25,000 to about 40,000 and Mw/Mn (number average molecular weight) from about 1.5 to about 5.

The following examples are given to illustrate the invention and should not be construed as limiting its scope. Unless otherwise indicated, all parts and percentages are by weight.

EXAMPLE 1

Preparation of the Mixed Copolymers

In step one of a two-step process, a 12-1 (liter) flask is charged with 892.95 g (3.91 mol) of bisphenol-A, 8.0 l methylene chloride and 804.3 g (10.71 mol) pyridine. Stirring is begun and when a clear solution of bisphenol-A is obtained, 20.9 g (0.103 mol) of terephthaloyl chloride and 20.9 g (0.103 mol) isophthaloyl chloride is added continuously over a period of 2 minutes while continuously stirring the contents of the flask at 25° C. and 250 rpm. The clear reaction solution is stirred an additional 10 minutes following diacid chloride addition before the second step of the process is begun.

In step two, the aforementioned reaction solution containing the ester intermediate is combined with 13.91 g (0.093 mol) p-tert-butylphenol (as chain terminator). The resulting solution is stirred at 175 rpm and 396.0 g (4.00 mol) phosgene is added over a period of 128 minutes by bubbling the phosgene into the liquid reaction solution at 24°–26° C.

The resulting polymeric product is recovered from the reaction mixture by the following procedure: 1.75 l of 3.0 N HCl is added to neutralize excess pyridine. Following phase separation, the methylene chloride solution of copolymer is washed consecutively with 1 l of 0.5 N HCl and 1 l of water, with phase separation after each washing. Following the final washing, the methylene chloride solution of copolymer is passed through a column packed with a cation exchange resin (sulfonic acid type, bed volume of 500–600 ml), giving a clear, almost water-white solution. The polymeric product is isolated by the slow addition of 1 volume of methylene chloride solution to 4 volumes of hexane with rapid stirring. The resulting white fibers are isolated by filtration, dried in air for 24 hours and then dried in vacuo 48 hours at 120° C. to yield 929.7 g (91.5 percent of theory) having an inherent viscosity of about 0.47 dl/g (measured in methylene chloride at 25° C., 0.5 g/dl).

Analysis of the copolymer by IR, NMR and elemental analysis indicates that it is a mixed copolymer represented by the structural formula:

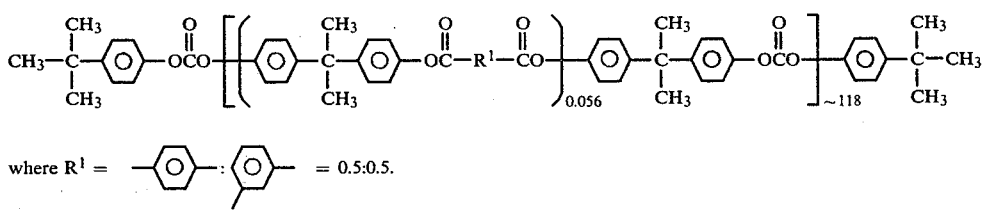

The mixed copolymer repeating unit has an ester:carbonate ratio of 0.11:1.

This mixed copolymer (Sample No. 1) is injection molded using a Newbury H1 30RS machine equipped with a Control Process, Inc. Process Sentry Model 750 and Process Recorder. The following molding conditions are used: barrel zones—316° C., nozzle—304° C., mold halves —121° C., injection time—10 seconds, total cycle time—45 seconds, feed setting—2.5, tensile bar and runner/limits—2000 psi and single stage injection mode. To compare processability, the injection pressure required to obtain a pressure of 4000 psi at the end of the molded tensile bar is determined. The physical properties and processability results for the 0.32 cm thick injection molded specimens are shown in Table I.

For purposes of comparison, the general procedure of this example is used to prepare paraphenylene and meta-phenylene copolymers from bisphenol-A, terephthaloyl chloride and phosgene (Sample No. A) and from bisphenol-A, isophthaloyl chloride and phosgene (Sample No. B) having an ester:carbonate ratio of 0.11:1. These polymers are injection molded as described hereinbefore and the physical properties and processability results for the 0.32 cm thick injection molded specimens are shown in Table I.

TABLE I

|  | Sample No. | | |
| --- | --- | --- | --- |
|  | A* | 1 | B* |
| TP:IP (1) | 1:0 | 0.5:0.5 | 0:1 |
| Inherent Viscosity (2), dl/g | 0.49 | 0.47 | 0.47 |
| Mw (3) | 57,740 | 52,337 | 52,792 |
| Melt Processability (4), psi | 5,000 | 4,750 | 4,750 |
| Vicat Softening (5), °C. | 161 | 159 | 158 |
| Izod Impact (6), ft-lb/in, notched | 13.05 | 13.23 | 14.85 |
| Tensile at Yield (7), psi | 8,653 | 8,769 | 8,921 |
| Elongation at Yield (7), % | 6.37 | 5.94 | 6.14 |
| Elongation at Break (7), % | 94.8 | 77.4 | 101.7 |
| Tensile Modulus (7), psi | 330,000 | 301,000 | 336,000 |
| Transmission (8), % | 86.3 | 86.7 | 88.1 |
| Haze (8), % | 1.8 | 3.2 | 2.3 |
| Yellowness Index (9) | 6.7 | 7.0 | 5.9 |

*Not an example of the invention.
(1) Molar ratio of terephthalate:isophthalate in copolymer.
(2) Measured in CH$_2$Cl$_2$ at 25° C., 0.5 g/dl.
(3) Determined by gel permeation chromatography (GPC), polystyrene calibration curve, tetrahydrofuran solvent.
(4) Injection pressure required to obtain 4,000 psi at end of molded tensile bar under conditions specified in this Example 1. A lower pressure indicates less energy is required to fabricate or mold the copolymer.
(5) ASTM D-1525
(6) ASTM D-256, 0.254 mm notched radius
(7) ASTM D-638
(8) ASTM D-1003
(9) ASTM D-1925

As evidenced by the data of Table I, the melt processability of the mixed copolymer (Sample No. 1) is better than that of the para-phenylene copolymer (Sample No. A) and equal to that of the meta-phenylene copolymer (Sample No. B).

EXAMPLE 2

Following the general procedure of Example 1, an additional mixed copolymer is prepared using bisphenol-A, terephthaloyl chloride, isophthaloyl chloride and phosgene as specified in Table II. This mixed copolymer has an ester:carbonate ratio of 0.67:1. For purposes of comparison, a para-phenylene copolymer and a metaphenylene copolymer having the same (0.67:1) ester:carbonate ratio are similarly prepared. These copolymers are injection molded as described hereinbefore and tested for physical properties as recorded in Table II.

TABLE II

|  | Sample No. | | |
| --- | --- | --- | --- |
|  | C* | 2 | D* |
| TP:IP (1) | 1:0 | 0.5:0.5 | 0:1 |
| Inherent Viscosity (2), dl/g | 0.51 | 0.49 | 0.47 |
| Mw (3) | 51,932 | 51,592 | 53,238 |
| Melt Processability (4), psi | 7,750 | 6,250 | 5,750 |
| Vicat Softening (5), °C. | 177 | 173 | 169 |
| Izod Impact (6), ft-lb/in, notched | 9.15 | 11.06 | 12.31 |
| Tensile at Yield (7), psi | 8,653 | 8,836 | 9,123 |
| Elongation at Yield (7), % | 7.35 | 6.47 | 6.57 |
| Elongation at Break (7), % | 69.0 | 52.3 | 55.0 |
| Tensile Modulus (7), psi | 300,000 | 289,000 | 320,000 |
| Transmission (8), % | 88.1 | 86.4 | 87.2 |
| Haze (8), % | 2.1 | 2.8 | 3.0 |
| Yellowness Index (9) | 5.9 | 6.7 | 6.3 |

*Not an example of the invention.
(1)–(9) Same as (1)–(9) in Table I.

As evidenced by the data shown in Table II, the melt processability of the mixed copolymer (Sample No. 2) is better than that of the para-phenylene copolymer (Sample No. C). The vicat softening point of the mixed copolymer is higher than that of the meta-phenylene copolymer (Sample No. D).

EXAMPLE 3

Following the general procedure of Example 1, additional mixed copolymers having different isophthalate:terephthalate molar ratios are prepared using bisphenol-A, terephthaloyl chloride, isophthaloyl chloride and phosgene as specified in Table III. These mixed copolymers have an ester-carbonate ratio of 1:1. For comparison, a para-phenylene copolymer and a metaphenylene copolymer having the same (1:1) ester-carbonate ratio are similarly prepared. These copolymers are injection molded and described hereinbefore and tested for physical properties as recorded in Table III.

TABLE III

|  | Sample No. | | | | | |
| --- | --- | --- | --- | --- | --- | --- |
|  | E* | 3 | 4 | 5 | 6 | F* |
| TP:IP (1) | 1:0 | 0.95:0.05 | 0.9:0.1 | 0.8:0.2 | 0.5:0.5 | 0:1 |
| Inherent Viscosity (2), dl/g | 0.55 | 0.56 | 0.55 | 0.57 | 0.53 | 0.51 |
| Mw (3) | 57,296 | 56,450 | 57,025 | 57,638 | 57,599 | 59,798 |
| Mw (4) | 33,480 | 35,324 | 35,441 | 36,772 | 36,231 | 35,072 |
| Melt Processability (5), psi | 11,750 | 11,500 | 11,000 | 10,750 | 9,000 | 7,500 |
| Vicat Softening (6), °C. | 185 | 187 | 186 | 185 | 179 | 171 |
| HDTUL (7), °C. | 153 | 153 | 152 | 152 | 151 | 145 |
| Izod Impact (8), ft-lb/in, notched | 8.74 | 8.50 | 8.64 | 9.29 | 9.70 | 12.08 |
| Tensile at Yield (9), psi | 8,634 | 8,633 | 8,685 | 8,585 | 8,851 | 9,135 |
| Elongation at Yield (9), % | 7.69 | 7.60 | 7.68 | 7.39 | 7.31 | 6.88 |
| Elongation at Break (9), % | 48.8 | 44.6 | 40.8 | 46.1 | 76.8 | 67.5 |
| Tensile Modulus (9), psi | 300,000 | 297,000 | 295,000 | 300,000 | 292,000 | 307,000 |
| Transmission (10), % | 84.5 | 83.9 | 85.3 | 85.5 | 87.1 | 85.2 |
| Haze (10), % | 4.4 | 4.0 | 4.3 | 3.8 | 2.9 | 3.9 |
| Yellowness Index (11) | 9.6 | 11.7 | 10.2 | 10.0 | 8.4 | 11.8 |

*Not an example of the invention.
(1)–(3) Same as (1)–(3) in Table I.
(4) Determined by GPC, bisphenol-A polycarbonate calibration.
(5) Same as (4) in Table I.
(6) ASTM D-1525
(7) Heat distortion temperature under load, 264 psi, ASTM D-648.
(8) ASTM D-256, 0.254 mm notched radius
(9) ASTM D-638
(10) ASTM D-1003
(11) ASTM D-1925

As evidenced by Table III, the melt processability of each mixed copolymer (Sample Nos. 3–6) is better than that of the para-phenylene copolymer (Sample No. E). At the same time, the heat resistance (Vicat softening point and heat distortion temperature) for each of the mixed copolymers is better than the heat resistance of the meta-phenylene copolymer (Sample No. F). Even more surprising, the heat resistance of three of the mixed copolymers (Sample Nos. 3–5) is equal to the heat resistance of the para-phenylene copolymer.

EXAMPLE 4

Following the general procedure of Example 1, additional mixed copolymers are prepared using bisphenol-A, terephthaloyl chloride, isophthaloyl chloride and phosgene as specified in Table IV. These mixed copolymers have an ester-carbonate ratio of 2:1. For comparison, meta-phenylene and para-phenylene copolymers having the same (2:1) ester:carbonate ratio are similarly prepared. These copolymers are injection molded as described hereinbefore and tested for physical properties as recorded in Table IV.

TABLE IV

| | Sample No. | | | | | | |
|---|---|---|---|---|---|---|---|
| | G* | 7 | 8 | 9 | 10 | 11 | H* |
| TP:IP (1) | 1:0 | 0.95:0.05 | 0.9:0.1 | 0.8:0.2 | 0.5:0.5 | 0.25:0.75 | 0:1 |
| Inherent Viscosity (2), dl/g | 0.55 | 0.56 | 0.54 | 0.54 | 0.52 | 0.50 | 0.50 |
| Mw (3) | 55,162 | 55,495 | 52,152 | 55,474 | 54,436 | 54,207 | 55,802 |
| Mw (4) | 32,929 | 32,716 | 32,031 | 32,346 | 32,106 | Not Meas. | 35,008 |
| Melt Processability (5), psi | 16,000 | 15,500 | 14,000 | 12,500 | 9,875 | 9,000 | 8,000 |
| Vicat Softening (6), °C. | 197 | 198 | 196 | 196 | 188 | 184 | 180 |
| HDTUL (7), °C. | 160 | 164 | 161 | 159 | 156 | 152 | 148 |
| Izod Impact (8), ft-lb/in, notched | 5.96 | 6.22 | 5.96 | 6.52 | 7.48 | 8.96 | 10.25 |
| Tensile at Yield (9), psi | 9,012 | 8,691 | 8,738 | 8,820 | 8,998 | 9,228 | 9,338 |
| Elongation at Yield (9), % | 8.47 | 8.61 | 8.14 | 8.08 | 7.52 | 7.20 | 7.06 |
| Elongation at Break (9), % | 34.5 | 40.3 | 30.2 | 50.0 | 57.6 | 51.3 | 53.8 |
| Tensile Modulus (9), psi | 308,000 | 282,000 | 292,000 | 293,000 | 303,000 | 310,000 | 295,000 |
| Transmission (10), % | 84.5 | 85.8 | 86.2 | 86.2 | 87.7 | 87.3 | 87.1 |
| Haze (10), % | 4.5 | 4.4 | 4.9 | 4.4 | 3.5 | 2.6 | 4.3 |
| Yellowness Index (11) | 10.3 | 10.1 | 9.3 | 10.3 | 9.6 | 6.2 | 8.4 |

*Not an example of the invention.
(1)–(11) Same as (1)–(11) in Table III.

The data of Table IV shows that the mixed copolymers having an ester:carbonate ratio of 2:1 exhibit advantages over the corresponding para-phenylene and meta-phenylene copolymers similar to those shown in Table III.

EXAMPLE 5

Following the general procedure of Example 1, additional mixed copolymers are prepared using bisphenol-A, terephthaloyl chloride, isophthaloyl chloride and phosgene as specified in Table V. These mixed copolymers have an ester:carbonate ratio of 3:1. For comparison, meta-phenylene and para-phenylene copolymers having the same (3:1) ester:carbonate ratio are similarly prepared. These copolymers are injection molded as described hereinbefore and tested for physical properties as recorded in Table V.

TABLE V

| | Sample No. | | | | |
|---|---|---|---|---|---|
| | I* | 12 | 13 | 14 | J* |
| TP:IP (1) | 1:0 | 0.9:0.1 | 0.8:0.2 | 0.5:0.5 | 0:1 |
| Inherent Viscosity (2), dl/g | 0.53 | 0.54 | 0.52 | 0.52 | 0.51 |
| Mw (3) | 50,610 | 48,490 | 50,664 | 51,263 | 51,918 |
| Mw (4) | 29,536 | 29,183 | 29,480 | 32,516 | 31,156 |
| Melt Processability (5), psi | 21,125 | 19,250 | 17,750 | 14,500 | 11,750 |
| Vicat Softening (6), °C. | 203 | 202 | 202 | 193 | 182 |
| Izod Impact (7), ft-lb/in, notched | 4.99 | 5.19 | 5.23 | 5.74 | 9.52 |
| Tensile at Yield (8), psi | 9,061 | 8,756 | 8,796 | 8,916 | 9,314 |
| Elongation at Yield (8), % | 8.94 | 8.62 | 8.32 | 7.83 | 6.83 |
| Elongation at Break (8), % | 38.8 | 41.7 | 34.7 | 40.2 | 48.8 |
| Tensile Modulus (8), psi | 297,000 | 289,000 | 292,000 | 291,000 | 299,000 |
| Transmission (9), % | 87.4 | 86.0 | 84.7 | 86.0 | 86.6 |
| Haze (9), % | 3.0 | 2.6 | 4.7 | 2.8 | 2.9 |
| Yellowness Index (10) | 15.3 | 17.8 | 12.4 | 14.9 | 15.7 |

*Not an example of the invention.
(1)–(6) Same as (1)–(6) in Table IV.
(7)–(10) Same as (8)–(11) in Table IV.

As evidenced by the data of Table V, the mixed copolymers having an ester:carbonate ratio of 3:1 exhibit advantages over the corresponding para-phenylene and meta-phenylene copolymers similar to those shown in Tables III and IV.

EXAMPLE 6

Following the general procedure of Example 1, a mixed copolymer, a para-phenylene copolymer, and a meta-phenylene copolymer are prepared using bisphenol-A, terephthaloyl chloride, isophthaloyl chloride and phosgene as specified in Table VI. These copolymers have an ester-carbonate ratio of 4:1. They are injection molded as described hereinbefore and tested for physical properties as recorded in Table VI.

TABLE VI

| | Sample No. | | |
|---|---|---|---|
| | K* | 15 | L* |
| TP:IP (1) | 1:0 | 0.5:0.5 | 0:1 |
| Inherent Viscosity (2), dl/g | 0.56 | 0.54 | 0.48 |
| Mw (3) | (a) | 53,262 | 52,670 |
| Melt Processability (4), psi | 18,750 | 11,000 | 7,000 |
| Vicat Softening (5), °C. | 206 | 196 | 184 |
| Izod Impact (6), ft-lb/in, notched | 4.32 | 5.32 | 9.08 |
| Tensile at Yield (7), psi | 9,123 | 9,148 | 9,500 |
| Elongation at Yield (7), % | 9.36 | 7.98 | 7.60 |
| Elongation at Break (7), % | 21.4 | 25.8 | 32.6 |
| Tensile Modulus (7), psi | 318,000 | 310,000 | 313,000 |
| Transmission (8), % | 84.1 | 85.3 | 85.1 |
| Haze (8), % | 5.3 | 3.3 | 2.7 |

TABLE VI-continued

|  | Sample No. | | |
| --- | --- | --- | --- |
|  | K* | 15 | L* |
| Yellowness Index (9) | 27.5 | 26.7 | 30.7 |

*Not an example of the invention.
(1)–(2) Same as (1)–(2) in Table I.
(3) Same as (3) in Table I.
(a) The copolymer is insoluble in tetrahydrofuran, thus GPC is not measured.
(4) Is similar to (4) of Table I except that the temperature of the barrel zones is 329° C. and the nozzle is 338° C.
(5)–(9) Same as (5)–(9) in Table I The data of Table VI shows that the mixed copolymer having an ester:carbonate ratio of 4:1 exhibits advantages over the corresponding para-phenylene and meta-phenylene copolymers similar to those shown in Tables I and II.

EXAMPLE 7

To further determine the advantages of the mixed copolymers, additional notched Izod impact resistance measurements are made on sample copolymers described in Tables III, IV and V using a sharper notch radius and lower temperatures and the results are shown in Table VII. As evidenced by these results, the mixed copolymers unexpectedly exhibit an impact resistance at sharper notch radius and lower temperatures that is equivalent to the impact resistance of the corresponding para-phenylene copolymers and is superior to the impact resistance of the corresponding meta-phenylene copolymers.

TABLE VII

| Sample No. | E:C (1) | TP:IP (2) | Izod Impact (3), ft-lb/in, Notched | | | | |
| --- | --- | --- | --- | --- | --- | --- | --- |
|  |  |  | 23° C. | 23° C. (4) | 0° C. | −18° C. | −30° C. |
| E* | 1:1 | 1:0 | 8.74 | 7.35 | (5) | (5) | 5.70 |
| 5 | 1:1 | 0.8:0.2 | 9.29 | 8.55 | (5) | (5) | 5.67 |
| F* | 1:1 | 0:1 | 12.08 | 1.39 | (5) | (5) | 1.86 |
| G* | 2:1 | 1:0 | 5.96 | 4.80 | 5.50 | 5.10 | 5.51 |
| 9 | 2:1 | 0.8:0.2 | 6.52 | 4.40 | 5.63 | 4.73 | 5.03 |
| 10 | 2:1 | 0.5:0.5 | 7.48 | 4.03 | (5) | 5.35 | 5.13 |
| H* | 2:1 | 0:1 | 10.25 | 1.16 | (5) | 1.95 | 1.89 |
| I* | 3:1 | 1:0 | 4.99 | 3.87 | (5) | (5) | 4.90 |
| 13 | 3:1 | 0.8:0.2 | 5.23 | 4.25 | (5) | (5) | 5.00 |
| J* | 3:1 | 0:1 | 9.52 | 1.66 | (5) | (5) | 2.18 |

*Not an example of the invention.
(1) Molar ratio of ester:carbonate in copolymer.
(2) Molar ratio of terephthalate:isophthalate in copolymer.
(3) ASTM D-256, 0.254 mm notch radius.
(4) 0.127 mm notch radius.
(5) Not measured.

SUMMARY OF DATA OF TABLES I–VI

A comparison of the observed melt processabilities for the mixed copolymer (Sample Nos. 1–15 which are shown in Tables I–VI) versus the injection pressures predicted using a linear interpolation of the observed injection pressures for the para-phenylene copolymers and meta-phenylene copolymers having the same Mw's and ester-carbonate ratios is presented in Table VIII. Sample Nos. 1–15 all exhibit a negative deviation from linearity, which means that they can be processed more easily than predicted. In addition, the data in Tables III–V show that at least 20 percent of the terephthalate groups can be replaced with isophthalate groups without sacrificing any heat resistance, as measured by Vicat softening temperature and heat distortion temperature under load. This unexpected combination of greater than predicted processability improvement without sacrificing thermal resistance is obtained without sacrificing the other physical properties, as evidenced by the data set forth in Tables I–VII.

TABLE VIII

| Sample No. | E:C (1) | TP:IP (2) | Melt Processabilities, psi | | |
| --- | --- | --- | --- | --- | --- |
|  |  |  | Observed | Predicted (3) | Deviation (4) |
| 1 | 0.11:1 | 0.5:0.5 | 4,750 | 4,875 | −125 |
| 2 | 0.67:1 | 0.5:0.5 | 6,250 | 6,750 | −500 |
| 3 | 1:1 | 0.95:0.05 | 11,500 | 11,538 | −38 |
| 4 | 1:1 | 0.9:0.1 | 11,000 | 11,325 | −325 |
| 5 | 1:1 | 0.8:0.2 | 10,750 | 10,900 | −150 |
| 6 | 1:1 | 0.5:0.5 | 9,000 | 9,625 | −625 |
| 7 | 2:1 | 0.95:0.05 | 15,500 | 15,600 | −100 |
| 8 | 2:1 | 0.9:0.1 | 14,000 | 15,200 | −1,200 |
| 9 | 2:1 | 0.8:0.2 | 12,500 | 14,400 | −1,900 |
| 10 | 2:1 | 0.5:0.5 | 9,875 | 12,000 | −2,125 |
| 11 | 2:1 | 0.25:0.75 | 9,000 | 10,000 | −1,000 |
| 12 | 3:1 | 0.9:0.1 | 19,250 | 20,188 | −938 |
| 13 | 3:1 | 0.8:0.2 | 17,750 | 19,250 | −1,500 |
| 14 | 3:1 | 0.5:0.5 | 14,500 | 16,438 | −1,938 |
| 15 | 4:1 | 0.5:0.5 | 11,000 | 12,875 | −1,875 |

(1) Molar ratio of ester:carbonate in copolymer.
(2) Molar ratio of terephthalate:isophthalate in copolymer.
(3) Based on linear interpolation of melt processabilities observed for para-phenylene copolymers and meta-phenylene copolymers having the same ester:carbonate ratio and Mw.
(4) Difference between observed and predicted melt processabilities.

What is claimed is:

1. A normally solid ordered copolyestercarbonate having repeating units of the formula:

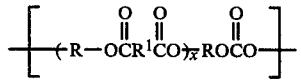

wherein each R is independently an aromatic hydrocarbylene or inertly substituted hydrocarbylene, x is a number from 0.05 to 10, some of $R^1$ are meta-phenylene or inertly substituted meta-phenylene and some of $R^1$ are para-phenylene or inertly substituted para-phenylene provided that the ratio of meta-phenylene or inertly substituted meta-phenylene to para-phenylene or inertly substituted para-phenylene is such that the melt processability of the ordered copolyestercarbonate is better than the melt processability of a similar copolyestercarbonate wherein all of $R^1$ are para-phenylene or inertly substituted para-phenylene.

2. The copolyestercarbonate of claim 1 represented by the formula:

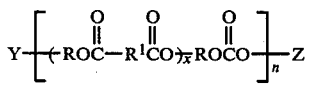

wherein each R is independently aromatic hydrocarbylene or inertly substituted aromatic hydrocarbylene; some of $R^1$ are meta-phenylene and some of $R^1$ are para-phenylene wherein the molar ratio of para-phenylene to meta-phenylene is from 0.95:0.05 to 0.05:0.95, Y is —OH or 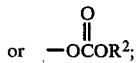

Z is —$R^2$ or —ROH; $R^2$ is hydrocarbyl; x is a number from 0.05 to 10 and n is a whole number from about 5 to about 300.

3. The copolyestercarbonate of claim 2 wherein each R is
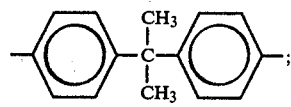
the molar ratio of para-phenylene to meta-phenylene is from about 0.9:0.1 to about 0.5:0.5; and x is a number from about 0.05 to about 3.
* * * * *

UNITED STATES PATENT AND TRADEMARK OFFICE
CERTIFICATE OF CORRECTION

PATENT NO. : 4,330,662

DATED : May 18, 1982

INVENTOR(S) : Stephen E. Bales

It is certified that error appears in the above—identified patent and that said Letters Patent is hereby corrected as shown below:

In the second column of the Abstract, line 3, delete "$R_1$" and insert --$R^1$--.

Column 3, line 45, after "t is" insert --a--.

Column 4, line 7, delete "phenolphthalimidine" and insert --phenolphthalimidene--.

Column 5, line 30, delete "60,00" and insert --60,000--.

Column 6, line 5, before "10°" insert --about--.

Column 8, line 1, delete "10.71" and insert --10.17--.

Column 9, Table I, under the heading "A*", the third entry, delete "57,740" and insert --54,740--.

Column 10, lines 37 and 39, delete "ester-carbonate" and insert --ester:carbonate--;
line 41, after "molded" delete "and" and insert --as--.

Column 11, line 17, delete "ester-carbonate" and insert --ester:carbonate--.

Column 12, line 52, delete "ester-carbonate" and insert --ester:carbonate--.

UNITED STATES PATENT AND TRADEMARK OFFICE
CERTIFICATE OF CORRECTION

PATENT NO. : 4,330,662
DATED : May 18, 1982
INVENTOR(S) : Stephen E. Bales

It is certified that error appears in the above—identified patent and that said Letters Patent is hereby corrected as shown below:

Column 13, line 58, delete "ester-carbonate" and insert --ester:carbonate--.

Column 14, line 59, before "Y" delete the comma "," and insert a semicolon --;--.

Signed and Sealed this

Fourteenth Day of December 1982

[SEAL]

Attest:

GERALD J. MOSSINGHOFF

Attesting Officer

Commissioner of Patents and Trademarks